United States Patent
Vartak et al.

(10) Patent No.: US 6,811,903 B2
(45) Date of Patent: Nov. 2, 2004

(54) ELECTROCHEMICAL CELL RECHARGING SYSTEM

(75) Inventors: Aditi Vartak, Lake Mohegan, NY (US); Tsepin Tsai, Chappaqua, NY (US)

(73) Assignee: Evionyx, Inc., Hawthorne, NY (US)

( * ) Notice: Subject to any disclaimer, the term of this patent is extended or adjusted under 35 U.S.C. 154(b) by 395 days.

(21) Appl. No.: 09/827,982

(22) Filed: Apr. 6, 2001

(65) Prior Publication Data

US 2002/0146600 A1 Oct. 10, 2002

(51) Int. Cl.$^7$ .............................................. H01M 12/00
(52) U.S. Cl. .................. 429/9; 429/7; 429/12; 429/27; 429/30; 429/40; 429/42; 429/44; 429/50; 429/59; 429/61; 429/149; 429/156; 429/209; 429/216; 429/247; 429/303; 320/112; 320/118; 320/119; 320/137; 320/138; 204/282; 204/283
(58) Field of Search .................. 429/9, 7, 12, 27, 429/30, 40, 42, 44, 50, 59, 61, 149, 156, 209, 216, 247, 303, 133, 162, 163, 110; 320/112, 118, 119, 137, 138, 4, 14, 17; 204/282, 283, 290 R (56) References Cited

U.S. PATENT DOCUMENTS

| | | | | | |
|---|---|---|---|---|---|
| 3,652,915 | A | * | 3/1972 | Eberts | 320/141 |
| 5,656,915 | A | * | 8/1997 | Eaves | 320/118 |
| 5,659,237 | A | * | 8/1997 | Divan et al. | 320/119 |
| 6,127,061 | A | * | 10/2000 | Shun et al. | 429/40 |
| 6,358,651 | B1 | * | 3/2002 | Chen et al. | 429/303 |

* cited by examiner

*Primary Examiner*—Randy Gulakowski
*Assistant Examiner*—Gentle E. Winter
(74) *Attorney, Agent, or Firm*—Ralph J. Crispino

(57) ABSTRACT

A rechargeable electrochemical cell system is provided. The system includes a plurality of cells, wherein each cell is comprised of a first electrode, a second electrode, and a third electrode electrically isolated from the second electrode. The cell system may be discharged upon application of a load across a discharge circuit, which is formed from the first electrodes and the second electrodes. The cell may be recharged upon application of a voltage across a recharging circuit, which is formed of at least one of the first electrodes and at least one of the third electrodes.

29 Claims, 8 Drawing Sheets

ELECTROCHEMICAL CELL RECHARGING SYSTEM

BACKGROUND OF THE INVENTION

1. Field of the Invention

This invention relates to electrochemical cells, and particularly to electrochemical cells that employ separate charging and discharging electrodes.

2. Description of the Prior Art

Electrochemical power sources are devices through which electric energy can be produced by means of electrochemical reactions. These devices include metal air electrochemical cells such as zinc air and aluminum air batteries. Certain metal air electrochemical cells employ an anode comprised of metal particles that are fed into the cell and consumed during discharge. Metal air cells include an anode, an air cathode, and an electrolyte. The anode is generally formed of metal particles immersed in electrolyte. The cathode generally comprises a semipermeable membrane and a catalyzed layer for reducing the oxidant, generally oxygen. The electrolyte is an ionic conductive but not electrically conductive material.

Metal air electrochemical cells have numerous advantages over traditional hydrogen-based fuel cells. In particular, the supply of energy provided from metal air electrochemical cells is virtually inexhaustible because the fuel, such as zinc, is plentiful and can exist either as the metal or its oxide. Further, solar, hydroelectric, or other forms of energy can be used to convert the metal from its oxide product back to the metallic fuel form. Unlike conventional hydrogen-oxygen fuel cells that require refilling, the fuel of metal air electrochemical cells is recoverable by electrically recharging. The fuel of the metal air electrochemical cells may be solid state, therefore, it is safe and easy to handle and store. In contrast to hydrogen-oxygen cells, which use methane, natural gas, or liquefied natural gas to provide as source of hydrogen, and emit polluting gases, the metal air electrochemical cells results in zero emission. The metal air cells operate at ambient temperature, whereas hydrogen-oxygen fuel cells typically operate at temperatures in the range of 80° C. to 1000° C. Metal air electrochemical cells are capable of delivering higher output voltages (1–3 Volts) than conventional fuel cells (<0.8V).

One of the principle obstacles of metal air electrochemical cells is related to charging the cell, i.e., transformation of electrical energy to chemical energy, particularly after discharge, i.e., transformation of chemical energy to electrical energy. Ideally, charging and recharging should proceed nearly reversibly, be energy efficient, and result in minimum physical changes to the cell that may limit the operable life of the cell.

Therefore, it would be desirable to provide a rechargeable electrochemical cell and a recharging system that is efficient and minimizes cell component degradation.

SUMMARY OF THE INVENTION

The above-discussed and other problems and deficiencies of the prior art are overcome or alleviated by the several methods and apparatus of the present invention, wherein a rechargeable electrochemical cell system is provided. The system includes a plurality of cells, wherein each cell is comprised of a first electrode, a second electrode, and a third electrode electrically isolated from the second electrode. The cell system may be discharged upon application of a load across a discharge circuit, comprised of the first electrodes and the second electrodes. The cell may be recharged upon application of a voltage across a recharging circuit, comprised of at least one of the first electrodes and at least one of the third electrodes.

The above-discussed and other features and advantages of the present invention will be appreciated and understood by those skilled in the art from the following detailed description and drawings.

BRIEF DESCRIPTION OF THE DRAWINGS

Numerous other advantages and features of the present invention will become readily apparent from the following detailed description of preferred embodiments when read in conjunction with the accompanying drawings, wherein FIG. 1(*a*) is a schematic representation of an electrochemical cell using a single electrode for charging and discharging operations;

FIG. 1(*b*) is a schematic representation of an electrochemical cell incorporating a separate charging electrode for charging operations;

FIG. 2(*a*) is a symbolic representation of the cell depicted in FIG. 1(*a*);

FIG. 2(*b*) is a symbolic representation of the cell depicted in FIG. 1(*b*);

DETAILED DESCRIPTION OF THE ILLUSTRATIVE EMBODIMENTS

A rechargeable electrochemical cell system is provided. The system includes a plurality of cells, wherein each cell is comprised of a first electrode, a second electrode, and a third electrode electrically isolated from the second electrode. The cell system may be discharged upon application of a load across a discharge circuit, which is formed from the first electrodes and the second electrodes. The cell may be recharged upon application of a voltage across a recharging circuit, which is formed of at least one of the first electrodes and at least one of the third electrodes.

Referring now to the drawings, an illustrative embodiment of the present invention will be described. For clarity of the description, like features shown in the figures shall be indicated with like reference numerals and similar features as shown in alternative embodiments shall be indicated with similar reference numerals.

Figure 1:
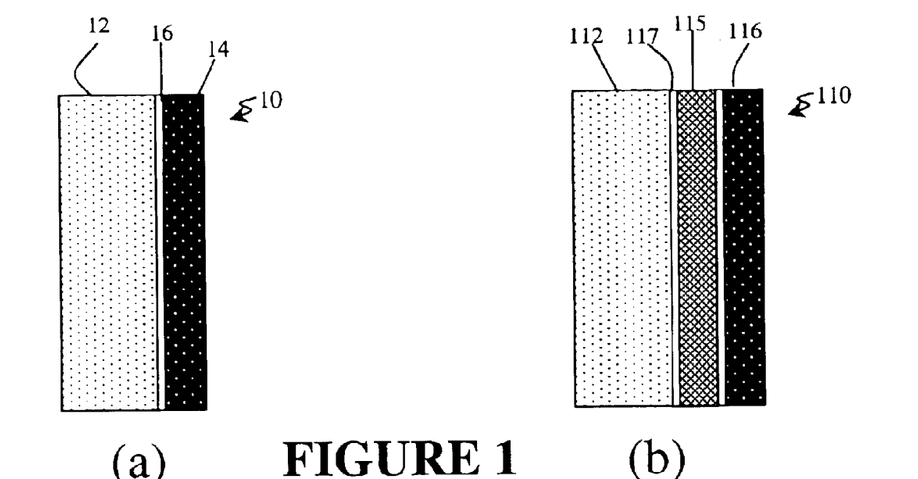
Figure 2:
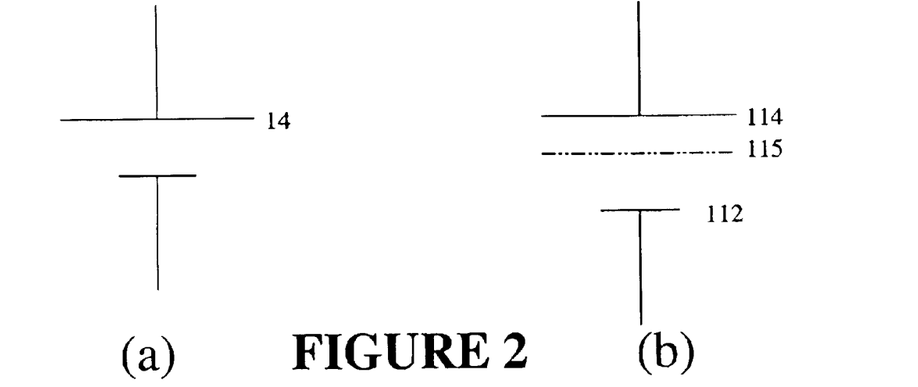

FIG. 1(a) is a schematic representation of an electrochemical cell 10 (wherein the symbol is represented in FIG. 2(a)). Electrochemical cell 10 may be a metal oxygen cell, wherein the metal is supplied from a metal anode 12 (typically a negative electrode) and the oxygen is supplied to an oxygen cathode 14 (typically a positive electrode). The anode 12 and the cathode 14 are maintained in electrical isolation from on another by a separator 16, and are maintained in ionic conduction with an electrolyte. The electrolyte may be an alkaline media such as a solution in which the anode 12 is submersed. Alternatively, the electrolyte may be imbibed within the anode 12. Further, the electrolyte may be formed within the separator 16.

During discharge, oxygen from an oxidant source (not shown) is used as the reactant for the air cathode 14 of the metal air cell 10. When oxygen reaches the reaction sites within the cathode 14, it is converted into hydroxyl ions together with water. At the same time, electrons are released to flow as electricity in the external circuit. The hydroxyl travels through the separator 16 to reach the metal anodes 12. When hydroxyl reaches the metal anode (in the case of an anode 12, for example, comprising zinc), zinc hydroxide is formed on the surface of the zinc. Zinc hydroxide decomposes to zinc oxide and releases water back to the alkaline solution. The reaction is thus completed.

The anode reaction is:

$$Zn + 4OH^- \rightarrow Zn(OH)_4^{2-} + 2e \quad (1)$$

$$Zn(OH)_4^{2-} \rightarrow ZnO + H_2O + 2OH^- \quad (2)$$

The cathode reaction is:

$$\tfrac{1}{2} + H_2O + 2e \rightarrow 2OH^- \quad (3)$$

Thus, the overall cell discharge reaction is:

$$Zn + \tfrac{1}{2}O_2 \rightarrow ZnO \quad (4)$$

During recharging operations, consumed anode material (i.e., oxidized metal), which is generally in ionic contact with the cathode 14, is converted into fresh anode material (i.e., metal) and oxygen upon application of a power source (e.g. more than 1–2 volts for metal-air systems) across the cathode 14 and consumed anode material.

The anode 12 may be any conventional anode for a metal air or metal oxygen cell. Typically, it provides an oxidizable fuel source including metal particles and an ionic conductor. Additionally, a current collector is also typically provided in electrical contact with the anode 12 to facilitate connection thereto. Further, one or more additional constituents such as binders or additives, are also optionally included. Preferably, the formulation optimizes ion conduction rate, density, and overall depth of discharge.

The metal constituent may comprise mainly oxidizable metals such as zinc, calcium, lithium, magnesium, ferrous metals, aluminum, and combinations and alloys comprising at least one of the foregoing metals. These metals may also be alloyed with constituents including, but not limited to, bismuth, indium, lead, mercury, gallium, tin, cadmium, molybdenum, tungsten, chromium, vanadium, germanium, arsenic, antimony, selenium, tellurium, strontium, and also additives such as polysaccharide and sorbitol.

The electrolyte generally comprises alkaline media in which the anode 12 may be submersed. Preferably, sufficient electrolyte is provided to maximize the reaction and depth of discharge. The electrolyte generally may comprise ionic conducting materials such as KOH, NaOH, other materials, or a combination comprising at least one of the foregoing electrolyte media.

The oxygen supplied to the cathode 14 may be from any oxygen source, such as air; scrubbed air; pure or substantially oxygen, such as from a utility supply, local system supply, or an on site oxygen manufacturing system; or any other processed air.

Cathode 14 may be a conventional air diffusion cathode which generally must be a bi-functional electrode in rechargeable cell configurations. For example, a cathode may generally comprise an active constituent and a carbon support, along with suitable connecting structures, such as a current collector. Of course, higher current densities may be attained with suitable cathode catalysts, oxidants, and formulations. The bi-functional characteristics of the cathode 14 allow it to function both during discharging and recharging operations. An exemplary air cathode is disclosed in copending, commonly assigned U.S. patent application Ser. No. 09/415,449, entitled "Electrochemical Electrode For Fuel Cell", to Wayne Yao and Tsepin Tsai, filed on Oct. 8, 1999, which is incorporated herein by reference in its entirety. Other air cathodes may instead be used, however, depending on the performance capabilities thereof, as will be obvious to those of skill in the art.

The carbon used is preferably chemically inert to the electrochemical cell environment and may be provided in various forms including, but not limited to, carbon flake, graphite, other high surface area carbon materials, or combinations comprising at least one of the foregoing carbon forms. The cathode current collector may be any electrically conductive material capable of providing electrical conductivity and optionally capable of providing support to the cathode 14. The current collector may be in the form of a mesh, porous plate, metal foam, strip, wire, foil, plate, or other suitable structure. In certain embodiments, the current collector is porous to minimize oxygen flow obstruction. The current collector may be formed of various electrically conductive materials including, but not limited to, nickel, nickel plated ferrous metals such as stainless steel, and the like, and combinations and alloys comprising at least one of the foregoing materials. Suitable current collectors include porous metal such as nickel foam metal.

A binder is also typically used in the cathode 14, which may be any material that adheres substrate materials, the current collector, and the catalyst to form a suitable structure. The binder is generally provided in an amount suitable for adhesive purposes of the diluent, catalyst, and/or current collector. This material is preferably chemically inert to the electrochemical environment. In certain embodiments, the binder material also has hydrophobic characteristics. Appropriate binder materials include polymers and copolymers based on polytetrafluoroethylene (e.g., Teflon® powder or emulsions such as and Teflon® T-30 commercially available from E. I. du Pont Nemours and Company Corp., Wilmington, Del.), sulfonic acid (e.g., Nafion® commercially available from E. I. du Pont Nemours and Company Corp.), polyvinylidene fluoride (PVDF), polyethylene fluoride (PEF), and the like, and derivatives, combinations and mixtures comprising at least one of the foregoing binder materials.

The active constituent is generally a suitable catalyst material to facilitate oxygen reaction at the cathode 14. The catalyst material is generally provided in an amount suitable to facilitate oxygen reaction at the cathode 14. Suitable catalyst materials include, but are not limited to: manganese and its compounds, cobalt and its compounds, platinum and its compounds, and combinations comprising at least one of the foregoing catalyst materials.

To electrically isolate the anode 12 from the cathode 14, the separator 16 is provided between the electrodes. In the cell 10 herein, the separator 16 is disposed on the anode 12 to at least partially contain the anode constituents. Separator 16 may be any commercially available separator capable of electrically isolating the anode 12 and the cathode 14, while allowing sufficient ionic transport between the anode 12 and the cathode 14. Preferably, the separator is flexible, to accommodate electrochemical expansion and contraction of the cell components, and chemically inert to the cell chemicals. Suitable separators are provided in forms including, but not limited to, woven, non-woven, porous (such as microporous or nanoporous), cellular, polymer sheets, and the like. Materials for the separator include, but are not limited to, polyolefin (e.g., Gelgard® commercially available from Dow Chemical Company), polyvinyl alcohol (PVA), cellulose (e.g., nitrocellulose, cellulose acetate, and the like), polyethylene, polyamide (e.g., nylon), fluorocarbon-type resins (e.g., the Nafion® family of resins which have sulfonic acid group functionality, commercially available from DuPont Chemicals, Wilmington, Del.), cellophane, filter paper, and combinations comprising at least one of the foregoing materials. The separator may also comprise additives and/or coatings such as acrylic compounds and the like to make them more wettable and permeable to the electrolyte. Further, the separator 16 may comprise a solid-state membrane, such as described in copending, commonly assigned U.S. Pat. No. 6,183,914, entitled "Polymer-based Hydroxide Conducting Membranes", to Wayne Yao, Tsepin Tsai, Yuen-Ming Chang, and Muguo Chen, filed on Sep. 17, 1998, which is incorporated herein by reference in its entirety; U.S. patent application Ser. No. 09/259,068, entitled "Solid Gel Membrane", to Muguo Chen, Tsepin Tsai, Wayne Yao, Yuen-Ming Chang, Lin-Feng Li, and Tom Karen, filed on Feb. 26, 1999, which is incorporated herein by reference in its entirety, and U.S. patent application Ser. No. 09/482,126, entitled "Solid Gel Membrane Separator In Rechargeable Electrochemical Cells", to Muguo Chen, Tsepin Tsai, and Lin-Feng Li, filed on Jan. 11, 2000, which is incorporated herein by reference in its entirety.

Referring now to FIG. 1(b), a rechargeable metal air cell 110 is shown (wherein the symbol is represented in FIG. 2(b)). The cell 110 includes a negative electrode 112 and a discharging electrode 114 in ionic contact. Further, a charging electrode 115 is disposed in ionic contact with the negative electrode 112, and electrically isolated from the cathode 114 with a separator 116 and electrically isolated from the negative electrode 112 with a separator 117. Since the charging electrode 115 is present, the cathode 114 may be a mono-functional electrode, e.g., formulated for discharging while the charging electrode 115 is formulated for charging. Further, with the use of the charging electrode 115, the cathode 114 may be operated primarily during discharging operations, and more preferably only during discharging operations. This allows the cathode 114 to achieve longer lifetimes and attain higher reliability during the lifetime. Furthermore, this allows use of materials otherwise not applicable in bi-functional electrodes.

In operation, consumed anode material (i.e., oxidized metal), which is in ionic contact with the charging electrode 115, is converted into fresh anode material (i.e., metal) and oxygen upon application of a power source (e.g. more than 1.2 volts for metal-air systems) across the charging electrode 115 and consumed anode material. The charging electrode 115 may comprise an electrically conducting structure, for example a mesh, porous plate, metal foam, strip, wire, plate, or other suitable structure. In certain embodiments, the charging electrode 115 is porous to allow ionic transfer. The charging electrode 115 may be formed of various electrically conductive materials including, but not limited to, copper, ferrous metals such as stainless steel, nickel, chromium, titanium, and the like, and combinations and alloys comprising at least one of the foregoing materials. Suitable charging electrodes include porous metal such as nickel foam metal.

Figure 3:
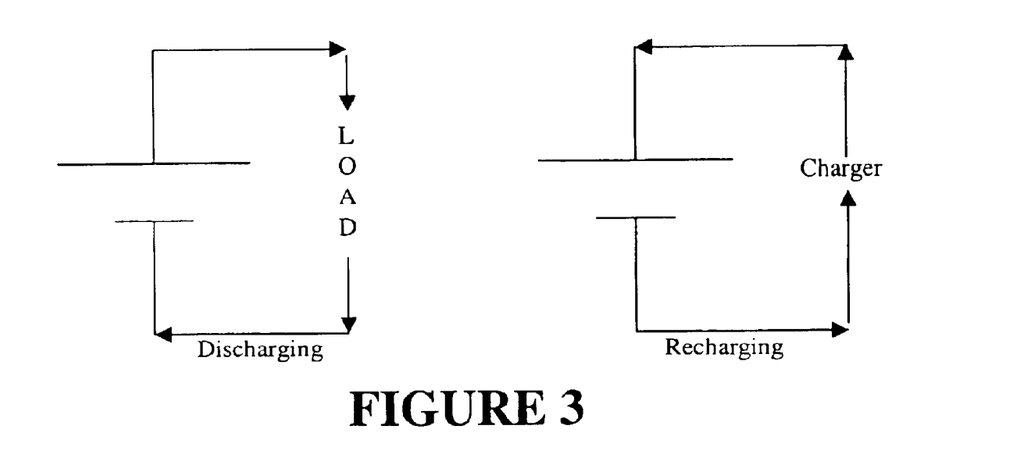
FIG. 3 schematically shows discharging and recharging of a typical battery cell.
Figure 4:
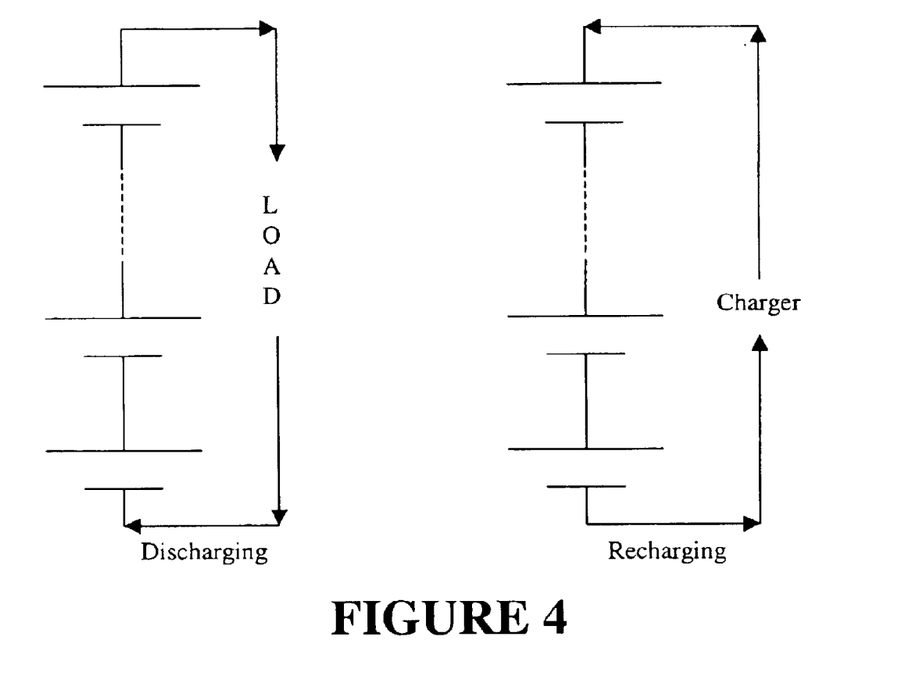
FIG. 4 schematically shows discharging and recharging of a system of typical battery cells.

Referring to FIGS. 3 and 4, recharging and discharging for a single cell (FIG. 3) and a plurality of cells (FIG. 4) are represented. During discharging, the current generally flows in series from the cathode through the load to the anode due to the electrochemical reaction. During recharging, the current generally flows in the opposite direction, from the current source to the cathode, causing electrochemical reaction to convert the metal oxide into metal.

Figure 5:
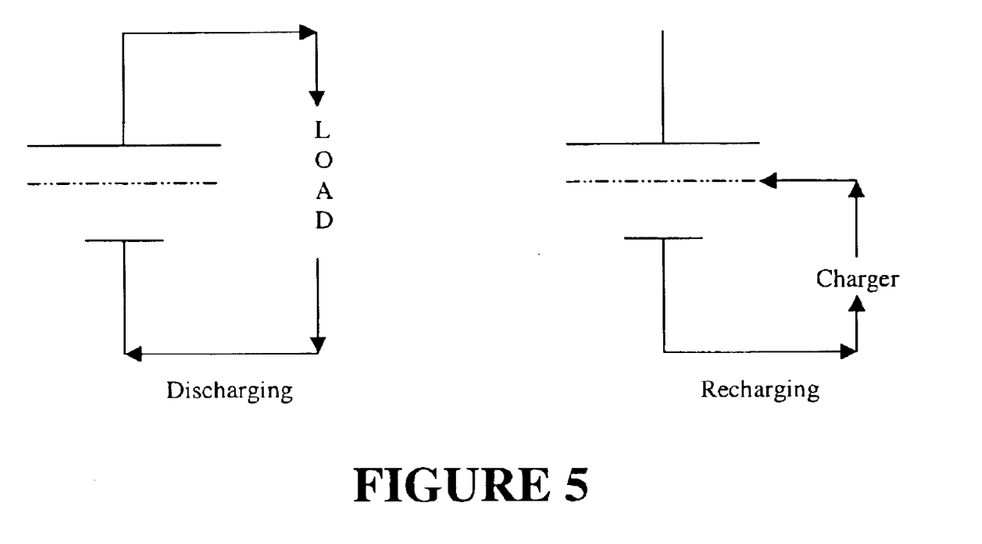
FIG. 5 schematically shows discharging and recharging of a battery cell using the structure and system herein.

FIG. 5 represents recharging and discharging for a cell including a charging electrode. During discharging, the current flow is similar to that of cells without a charging electrode. However, during recharging, current flows though the charging electrode and the anode. Current flow through the cathode is preferably eliminated, as it causes degradation of the cathode structure, thus decreasing performance of the cathode and cell.

Figure 6:
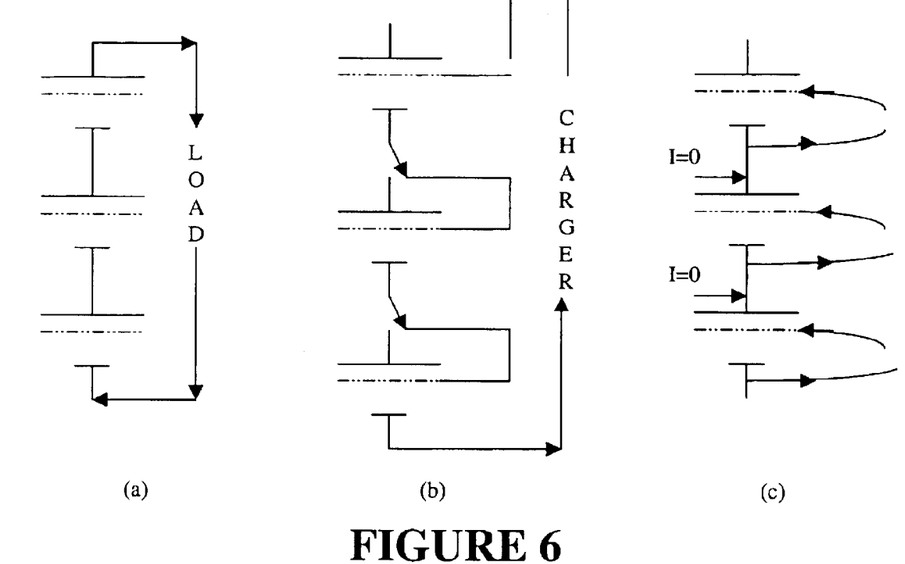
FIG. 6 schematically shows discharging and recharging of battery cells using embodiments of the structure and system herein.

Referring now to FIGS. 6(a)–6(c), discharging and recharging operation of a plurality of cells each including a charging electrode is schematically depicted. FIG. 6(a) represents discharging, wherein the current flows across the load and the plurality of cells. FIG. 6(b) represents one embodiment of a system for recharging the cells, wherein current from a charging device is applied across the charging electrodes and the anodes. During recharging, current is isolated from the air cathodes, which is accomplished by a one pole two way switchable circuit between an anode of one cell and a charging electrode and cathode of another cell. Accordingly, when a switch is in one position the anode is connected to the cathode of an adjacent cell and the circuit is configured for discharging operations. When the switch is switched to the other position, the anode is connected to a third electrode of the adjacent cell and a cell circuit is configured for recharging operations. The switches may be any conventional switch capable of handling the desired current and/or voltage. Suitable switches include, but are not limited to, mechanical switches, semiconductor switches, or molecular (chemical) switches.

In another embodiment, and referring now to FIG. 6(c), the system provides a continuous discharging path (e.g., without any switches between the cells). Each cell is charged by a discrete power source which is isolated from the power source associated with other cells. Therefore, no current passes through cathode during charging operations. Additionally, the discharging path may remain connected during charging operations (e.g., as opposed to the system in FIG. 6(b) wherein the discharging path is disconnected during charging). Furthermore, discrete charging allows for a controlled voltage application across each cell. In this configuration, absence of a switching circuit in the discharge path minimizes various detriments associated with typical switches or switching circuits. Such detriments include increased internal resistance due to the contact resistance of the switches, power loss and heat generation during discharging, and inefficiencies associated with the switch driving mechanism.

The isolated charging voltage (with or without switches) may be effectuated with a system of transformers, capacitors, switches, power supply systems, microprocessor systems, software systems, and combinations comprising at least one of the foregoing apparatus. Further, while the isolated charging voltages are depicted as being applied to individual cells, other schemes may be desirable, such as applying isolated charging voltages to groups of cells in various combinations. Different methods of individual and isolated cell charging are proposed are shown in FIGS. 7, 8, and 9.

Figure 7:
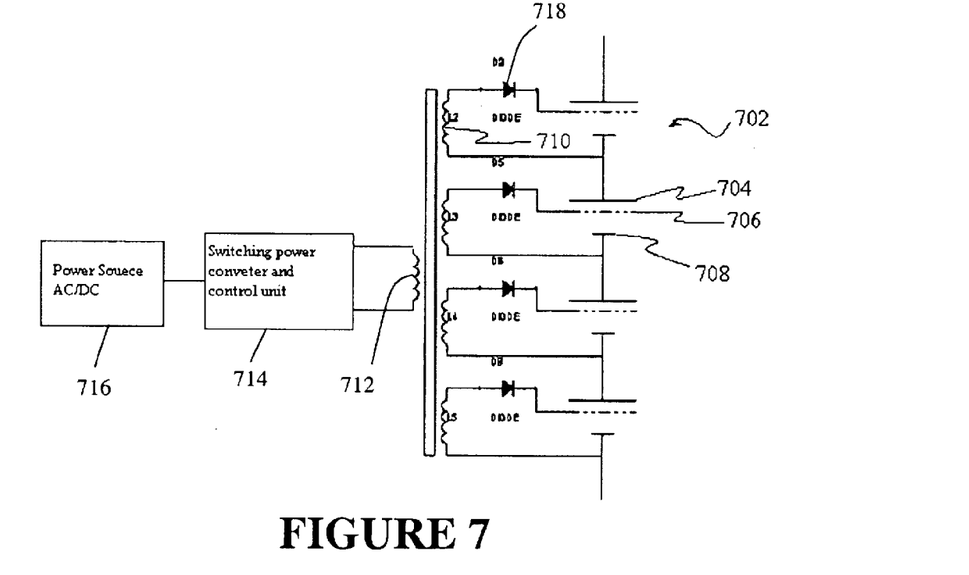
FIG. 7 is an exemplary circuit diagram of a recharging system of battery cells using an embodiment of the structure and system herein.

Referring to FIG. 7, an embodiment of a cell system 700 employing an individual and isolated charging voltage system is illustrated. System 700 includes a plurality of cells 702 including a discharging electrode 704, a charging electrode 706, and a negative electrode 708. During discharging operation, the cells 702 produce energy through the discharging electrodes 704 and the negative electrodes 708. During recharging operation, discrete voltages are applied across charging electrodes 706 and the negative electrodes 708, which does not affect discharging electrodes 704.

The discrete charging voltage is applied through a system of current transformers, preferably high frequency high current transformers, with a single primary 712 and multiple secondary windings 710 associated with each cell 702 through a diode 718. The primary is driven by switching power converter and control unit 714 which may contain pulse width modulation (PWM) control circuit and various switching converter topologies including, but not limited to, flyback converter, forward converter, push pull converter, half wave bridge converter, full wave bridge converter etc. In one embodiment, PWM circuitry is used to maintain proper duty cycle for adjusting output parameters suitable for optimal charging of each cell. A power source 716 is coupled to the circuit, which could be AC or DC depending on voltage, current and space constrains of the application. A diode or rectifier 718 is used to provide rectified directional flow of current.

Figure 8:
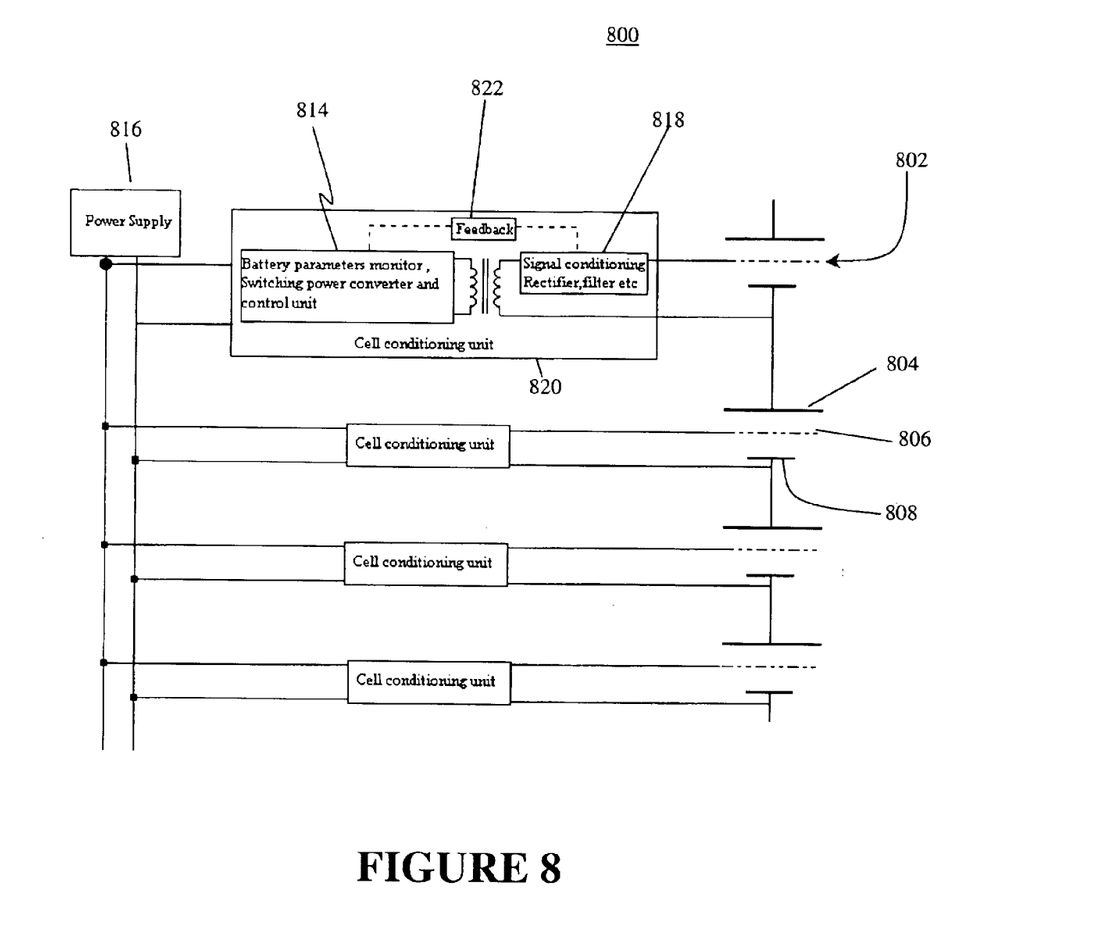
FIG. 8 schematically shows a system of battery cells using another embodiment of the structure and system herein.
Figure 9:
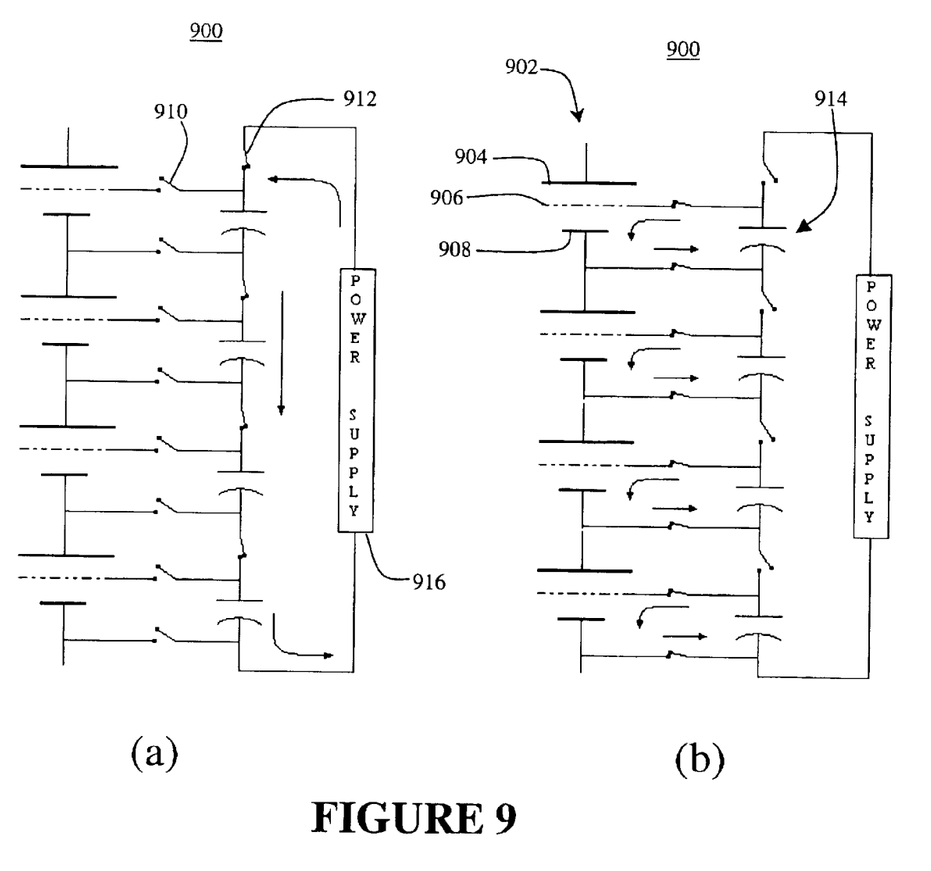
FIG. 9 schematically shows a system and discharging and recharging operation of battery cells using a further embodiment of the structure and system herein.

FIG. 8 represents another embodiment of an isolated charging system 800. During discharging operation, the cells 802 produce energy through the discharging electrodes 804 and the negative electrodes 808. During recharging operation, discrete voltages are applied across charging electrodes 806 and the negative electrodes 808, isolated from the discharging electrodes 804 of other cells. In this system charging of each cell is controlled by a cell conditioning unit 820. The cell conditioning unit 820 may contain various systems 814 such as PWM control circuitry; various switching converter topologies including, but not limited to flyback converter, forward converter, push pull converter, half wave bridge converter, and full wave bridge converter; battery parameters monitor (which can provide battery parameters to external monitoring circuit); PWM control circuitry (to allow charging parameters to be adjusted for optimal performance); software systems; microprocessor systems; or any combination comprising at least one of the foregoing systems. The cell conditioning unit 820 further includes a signal conditioning unit 818 coupled to the charging electrode circuit (i.e., the negative electrodes 808 and the charging electrode 806). For example, the signal conditioning unit 818 may comprise one or more rectifiers, regulators, filters, etc., or combinations thereof, for proving directional and noise free charging. A unit 822 provides feedback to the control and monitoring circuit of battery parameters and battery condition including, but not limited to, charging voltage, current, temperature, etc. The feedback circuit contains an isolating circuit which could be optical or magnetic. A power source 816 may be AC or DC depending on voltage, current and space constraints of the application.

FIG. 9 shows a switched capacitor charging circuit 900. During discharging operation, the cells 902 produce energy through the discharging electrodes 904 and the negative electrodes 908. During recharging operation, voltages are applied across charging electrodes 906 and the negative electrodes 908, isolated from the discharging electrodes 904 of other cells. Charging is carried out in two steps. In a first step (identified in FIG. 9 as (a)) switches 912 are closed and switches 910 are opened thereby charging capacitors 914 from power supply 916. In a second step (identified in FIG. 9 as (b)) switches 912 are opened and 910 are closed thus charging the respective cell through charge that has been stored in the capacitor. These steps are repeated at a frequency best suited for charging the capacitor and charging the cell system. Capacitor type and value is selected based on factors including but not limited to charging time and switching frequency. The switches 910 and 912 may be controlled by one or more suitable control devices (not shown), as will be apparent to one skilled in the art. The switches may be any conventional switch capable of handling the desired current and/or voltage. Suitable switches include mechanical switches and semiconductor switches.

Figure 10:
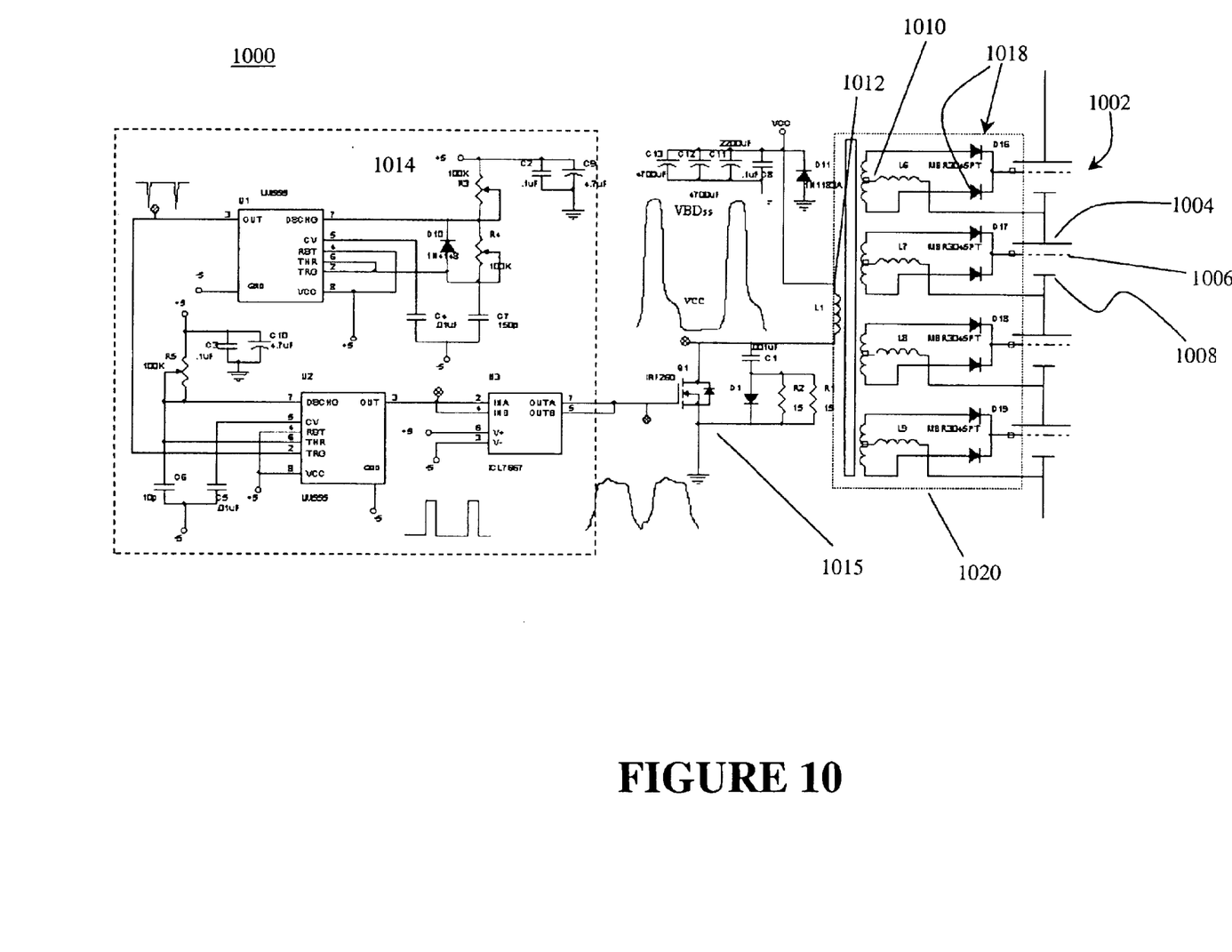
FIG. 10 is an exemplary circuit diagram of a recharging system of battery cells using an additional embodiment of the structure and system herein.
Figure 11:
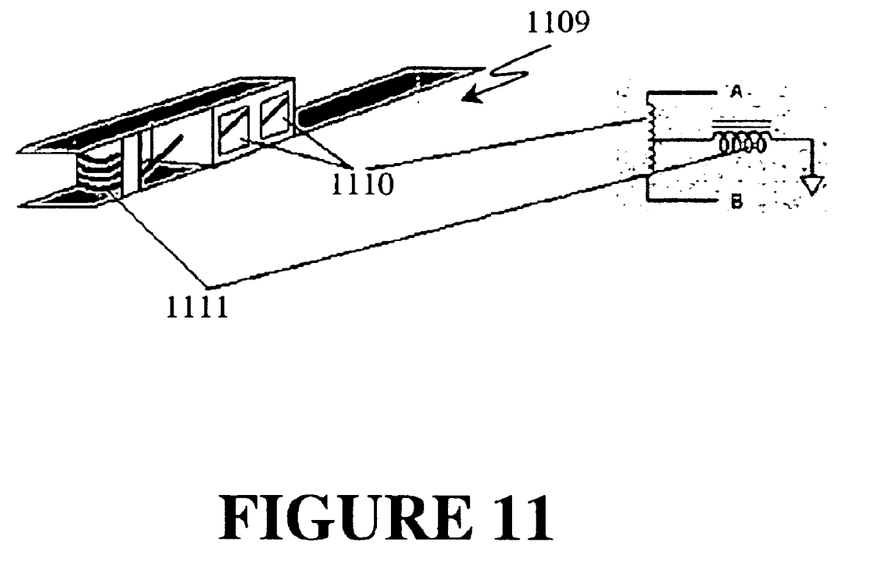
FIG. 11 is an example of a transformer that may be used in various embodiments of the structure and system herein.
Figure 12:
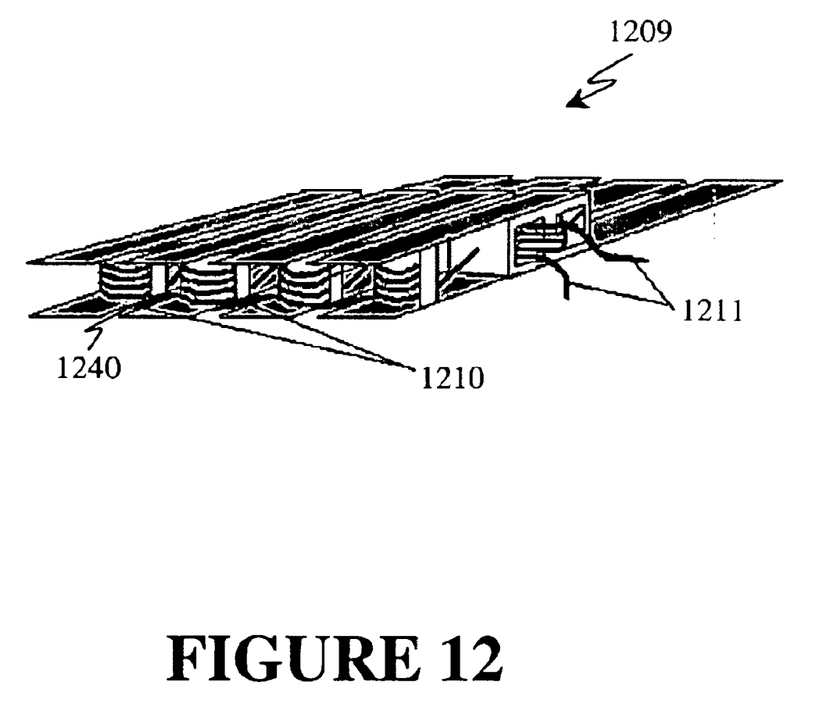
FIG. 12 is an example of a plurality of transformers that may be used in various embodiments of the structure and system herein.

FIG. 10 illustrates another exemplary embodiment of a system 1000 for charging of metal-air cells. During discharging operation, each cell 1002 produces energy through a discharging electrode 1004 and a negative electrode 1008. During recharging operation, voltage is applied across each cell 1002 through a charging electrode 1006 and the negative electrode 1008, isolated from the discharging electrodes 1004 of other cells. A single primary 1012 and multiple secondary 1010 transformer was constructed using a low profile (dimensional), high frequency, and high current flat transformer module. A flat transformer identified as FTI-12X2A-1B available from Flat Transformer Technology Corp., Costa Mesa, Calif. was used for this purpose. This transformer has an output capacity of 1 to 20 volts and up to about 20 amperes at frequencies in the range of hundreds of kilohertz. Construction of one such module is shown in FIG. 11 as a transformer 1109. An assembly of four such modules is shown in FIG. 12, wherein the individual transformers 1209 are electrically isolated from each other with suitable insulators 1240. The primary was wound through the cores of the plurality of transformers 1209. A rectifier 1018 may be used for rectification of the secondary output waveform. The assembly of the transformer(s) and the rectifiers 1018 may be enclosed in a shielding box 1020 to avoid magnetic interference. An oscillator 1014 contains timers (e.g., LM555 timers) as an oscillator switching device coupled to a MOSFET 1015 (e.g., at frequency of 400 KHz). R4 and R5 control the duty cycle of the waveform, which in turn controls the charging current.

Figure 13:
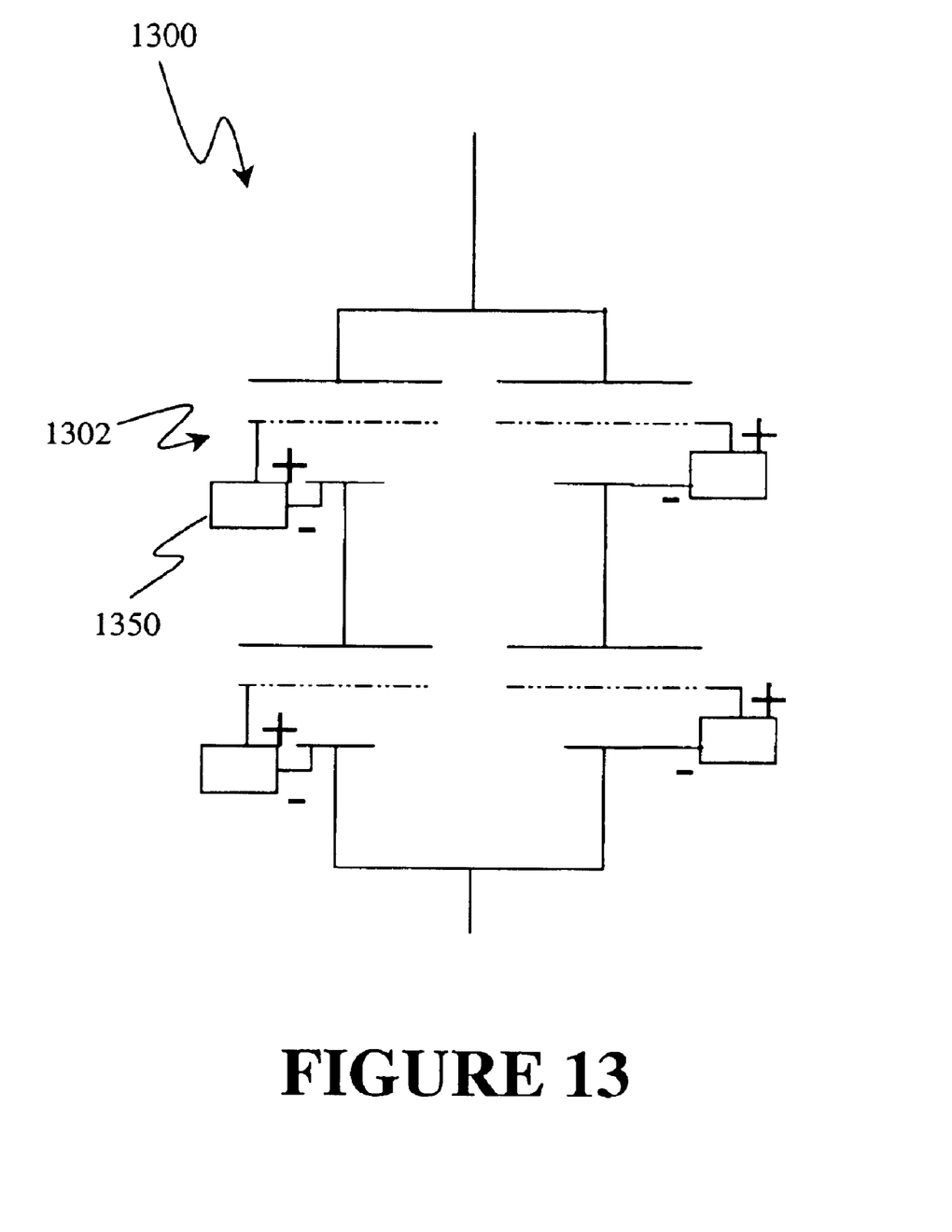
FIG. 13 is an exemplary circuit diagram of a parallel system of battery cells using an additional embodiment of the structure and system herein.

A further alternative system 1300 is depicted in FIG. 13. A plurality of cells 1302 are arranged in parallel. The discharging circuit remains connected during recharging of the cells 1302 via the recharging voltage source 1350, which may comprise any of the systems described herein (e.g., switched, power supply, transformer, capacitor, etc.).

With the recharging system and cell using the recharging system described herein, various benefits are derived. The life and reliability of the discharging electrodes may be substantially increased since voltage is minimally, or more preferably not at all, applied across the discharging electrode and the negative electrode during recharging operations. Isolated charging increases charging efficiency and allows for a controlled voltage application across each cell. In certain configurations, wherein use of switches is minimized, internal resistance due to the contact resistance of the switches is decreased, as is heat generation during recharging and discharging, as well as other inefficiencies associated with the switch driving mechanism. Further, application of discrete and isolated voltages may be controlled and directed to certain cells or groups of cells within a system.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A rechargeable electrochemical cell system comprising:
   a plurality of rechargeable cells, each rechargeable cell including
   a first electrode, a second electrode, and a third electrode electrically isolated from the second electrode; wherein each cell is configured for being discharged upon application Office action a load across the first electrode and the second electrode, and
   wherein each cell is configured for being independently recharged upon application of the voltage across the first electrode and the third electrode of each cell in isolation from the other cells;
   wherein the voltage for the recharging is applied by one or more transformers; and
   wherein the transformer comprises a single primary winding and a plurality of secondary windings, each secondary winding associated with a third electrode and a corresponding cell.

2. The rechargeable electrochemical cell system as in claim 1 wherein each second electrode is in isolation from the voltage across each corresponding first electrode and third electrode when the cell is recharged.

3. The rechargeable electrochemical cell as in claim 1, wherein the isolation is effectuated by a transformer, a power supply, capacitor, a combination comprising at least one of the foregoing.

4. The rechargeable electrochemical cell system as in claim 1, further comprising a switching power converter coupled to a power source in operable connection with the primary winding.

5. The rechargeable electrochemical cell system as in claim 1, wherein the switching power converter comprises a MOSFET device.

6. The rechargeable electrochemical cell system as in claim 4, wherein the power source is controlled by a control unit.

7. The rechargeable electrochemical cell system as in claim 6, wherein the control unit comprises an oscillator.

8. The rechargeable electrochemical cell system as in claim 1, further comprising a diode between at least one pair of the secondary winding and the third electrode.

9. The rechargeable electrochemical cell system as in claim 1, further comprising a rectifier between at least one pair of the secondary winding and the third electrode.

10. The rechargeable electrochemical cell system as in claim 1, wherein the voltage across the first electrode and the third electrode is provided from a power supply.

11. The rechargeable electrochemical cell system as in claim 10, further comprising a cell conditioning unit between the power supply, and the recharging circuit of each cell in the system.

12. The rechargeable electrochemical cell system as in claim 11, wherein the cell conditioning unit comprises a switching power converter.

13. The rechargeable electrochemical cell system as in claim 11, wherein the cell conditioning unit comprises a battery parameters monitor.

14. The rechargeable electrochemical so system as in claim 11, wherein the cell conditioning unit comprises signal conditioning system.

15. The rechargeable electrochemical cell system as in claim 11, wherein the cell conditioning unit comprises a filter.

16. The rechargeable electrochemical cell system as in claim 1, wherein the voltage is applied across the recharging circuit with a capacitor.

17. The rechargeable electrochemical cell system is in claim 16, wherein the capacitor is coupled to a power supply.

18. The rechargeable electrochemical cell system is in claim 17, wherein the capacitor is charged by the power supply by operation of a switch device.

19. The rechargeable electrochemical cell system as in claim 16, wherein the capacitor is connected across the recharging circuit via a switch between the capacitor and the first electrode and the switch between the capacitor and the third electrode.

20. The rechargeable electrochemical cell system as in claim 17, wherein the capacitor is coupled to the first electrode via a first switch and wherein the capacitor is coupled to the second electrode via a second switch, and wherein the power supply is coupled to the capacitor via a third switch.

21. The rechargeable electrochemical cell system as in claim 20, wherein operation of the third switch, and operation of the first and second switches, are optimized based on charging the capacitor and charging the individual cells.

22. The rechargeable electrochemical cell system as in claim 1, wherein the cell is recharging upon application of a selective voltage across one or more selected recharging circuits.

23. The rechargeable electrochemical cell system as in claim 22, wherein selected recharging circuits are selected based on charging requirements.

24. The rechargeable electrochemical cell system as in claim 1, wherein at least a portion of the plurality of cells are arranged in series.

25. The rechargeable electrochemical cell system as in claim 1, wherein at least a portion of the plurality of cells are arranged in parallel.

26. A method of recharging the rechargeable cell system of claim 1 comprising: applying a discrete power source to each cell which is isolated from the power source associated with the other cells.

27. The method as in claim 26, wherein the isolation is effectuated by a transformer, a power supply, a capacitor, a switch, or a combination comprising at least one of the foregoing.

28. The method as in claim 26, wherein the voltage for recharging is applied by one or more transformers.

29. The method as in claim 26, wherein the transformer comprises a single primary winding and a plurality of secondary windings, each secondary winding associated with a charging electrode of a corresponding cell.

* * * * *

UNITED STATES PATENT AND TRADEMARK OFFICE
CERTIFICATE OF CORRECTION

PATENT NO. : 6,811,903 B2
DATED : November 2, 2004
INVENTOR(S) : Vartak et al.

It is certified that error appears in the above-identified patent and that said Letters Patent is hereby corrected as shown below:

<u>Column 9,</u>
Lines 24-28, should read
-- a first electrode, a second electrode, and a third electrode electrically isolated from the second electrode; wherein each cell is configured for being discharged upon application of a load across the first electrode and the second electrode, and --

Signed and Sealed this

Ninth Day of August, 2005

JON W. DUDAS
*Director of the United States Patent and Trademark Office*